(12) United States Patent
Gibbon et al.

(10) Patent No.: US 8,131,552 B1
(45) Date of Patent: *Mar. 6, 2012

(54) SYSTEM AND METHOD FOR AUTOMATED MULTIMEDIA CONTENT INDEXING AND RETRIEVAL

(75) Inventors: David Crawford Gibbon, Lincroft, NJ (US); Qian Huang, Rockville, MD (US); Zhu Liu, Middletown, NJ (US); Aaron Edward Rosenberg, Berkley Heights, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 244 days.

This patent is subject to a terminal disclaimer.

(21) Appl. No.: 11/623,955

(22) Filed: Jan. 17, 2007

Related U.S. Application Data

(63) Continuation of application No. 10/686,459, filed on Oct. 15, 2003, now Pat. No. 7,184,959, which is a continuation of application No. 09/716,278, filed on Nov. 21, 2000, now Pat. No. 6,714,909.

(51) Int. Cl.
*G06F 19/26* (2011.01)
*G10L 17/00* (2006.01)

(52) U.S. Cl. ........ 704/270; 704/246; 715/201; 715/716; 725/45

(58) Field of Classification Search ............... 704/231, 704/235, 246, 251, 255, 270, 278; 725/40, 725/45; 715/201, 716
See application file for complete search history.

(56) References Cited

U.S. PATENT DOCUMENTS

| | | | |
|---|---|---|---|
| 5,572,728 A | 11/1996 | Tada et al. | |
| 5,596,373 A * | 1/1997 | White et al. | 348/569 |
| 5,717,869 A * | 2/1998 | Moran et al. | 715/716 |
| 5,793,903 A | 8/1998 | Lopresti et al. | |
| 5,844,620 A * | 12/1998 | Coleman et al. | 725/54 |
| 5,852,684 A | 12/1998 | Lopresti et al. | |
| 5,892,507 A * | 4/1999 | Moorby et al. | 715/205 |
| 5,905,981 A | 5/1999 | Lawler | |
| 6,151,059 A * | 11/2000 | Schein et al. | 725/37 |
| 6,166,735 A | 12/2000 | Dom et al. | |
| 6,195,497 B1 | 2/2001 | Nagasaka et al. | |
| 6,199,034 B1 | 3/2001 | Wical | |
| 6,263,507 B1 | 7/2001 | Ahmad et al. | |

(Continued)

FOREIGN PATENT DOCUMENTS

JP 06-266495 9/1994

(Continued)

OTHER PUBLICATIONS

Makhoul et al., "Speech and Language Technologies for Audio Indexing and Retrieval", Proceedings of the IEEE, vol. 88, Issue 8, Aug. 2000, pp. 1338 to 1353.*

(Continued)

*Primary Examiner* — Martin Lerner

(57) ABSTRACT

The invention provides a system and method for automatically indexing and retrieving multimedia content. The method may include separating a multimedia data stream into audio, visual and text components, segmenting the audio, visual and text components based on semantic differences, identifying at least one target speaker using the audio and visual components, identifying a topic of the multimedia event using the segmented text and topic category models, generating a summary of the multimedia event based on the audio, visual and text components, the identified topic and the identified target speaker, and generating a multimedia description of the multimedia event based on the identified target speaker, the identified topic, and the generated summary.

13 Claims, 14 Drawing Sheets

U.S. PATENT DOCUMENTS

| | | | |
|---|---|---|---|
| 6,295,092 B1 | 9/2001 | Hullinger et al. | |
| 6,317,710 B1 | 11/2001 | Huang et al. | |
| 6,363,380 B1 | 3/2002 | Dimitrova | |
| 6,405,166 B1 | 6/2002 | Huang et al. | |
| 6,442,523 B1 | 8/2002 | Siegel | |
| 6,473,778 B1 * | 10/2002 | Gibbon | 715/201 |
| 6,567,980 B1 * | 5/2003 | Jain et al. | 725/61 |
| 6,580,437 B1 * | 6/2003 | Liou et al. | 715/719 |
| 6,608,930 B1 * | 8/2003 | Agnihotri et al. | 382/176 |
| 6,631,523 B1 * | 10/2003 | Matthews et al. | 725/53 |
| 6,714,909 B1 * | 3/2004 | Gibbon et al. | 704/246 |
| 6,789,088 B1 * | 9/2004 | Lee et al. | 707/741 |
| 6,801,895 B1 * | 10/2004 | Huang et al. | 704/270 |
| 6,961,954 B1 * | 11/2005 | Maybury et al. | 725/53 |
| 7,055,168 B1 * | 5/2006 | Errico et al. | 725/46 |
| 7,146,627 B1 * | 12/2006 | Ismail et al. | 725/47 |
| 7,184,959 B2 * | 2/2007 | Gibbon et al. | 704/270 |
| 7,185,049 B1 * | 2/2007 | Benitez et al. | 709/203 |
| 7,493,640 B1 * | 2/2009 | Derrenberger et al. | 725/42 |
| 7,673,239 B2 * | 3/2010 | Huang et al. | 715/717 |
| 7,877,774 B1 * | 1/2011 | Basso et al. | 725/44 |
| 7,970,822 B2 * | 6/2011 | Benitez et al. | 709/203 |
| 2002/0083473 A1 | 6/2002 | Agnihotri et al. | |
| 2004/0078188 A1 * | 4/2004 | Gibbon et al. | 704/1 |
| 2010/0042387 A1 * | 2/2010 | Gibbon et al. | 703/6 |

FOREIGN PATENT DOCUMENTS

| | | |
|---|---|---|
| JP | 08-287094 | 11/1996 |

OTHER PUBLICATIONS

Hori et al, "Automatic speech summarization based on word significance and linguistic likelihood", IEEE International Conference on Acoustics, Speech, and Signal Processing, 2000. ICASSP '00, vol. 3, Jun. 5-9, 2000, pp. 1579 to 1582.*

Wikipedia, "Mel frequency cepstral coefficient", 2 Pages.*

Ozsoyoglu et al., "Automating the Assembly of Presentations from Multimedia Databases", Proceedings of the Twelfth International Conference on Data Engineering, Mar. 1996.

Magrin-Chagnolleau et al., "Indexing Telephone Conversations by Speakers Using Time-Frenquency Principle Component Analysis", IEEE International Conference on Multimedia and Expo, Jul. 2000.

Botafogo et al., "The Morena Model for Hypermedia Authoring and Browsing", Proceedings of the International Conference on Multimedia Computing and Systems, May 1995.

Not et al., "Reusing Information Repositories for Flexibility Generating Adaptive Presentations", Conference on Information Intelligence and Systems, Nov. 1999.

Automated Generation of News Content Hierarchy by Integrating Audio, Video and Text Information, ICASSP, 1999, Phoenix, AZ, Mar. 1999.

* cited by examiner

| A | D | C | A | D | A | C | A | D | A | C |

$T_2^1$ $T_1^1$ $T_2^2$ $T_1^2$ $T_2^3$ $T_1^3$ $T_2^4$ $T_1^4$ $T_2^5$ $T_1^5$ $T_1^k$ – BLOCKS OF TEXT SEGMENTED USING ANCHOR ID $T_2^k$ – BLOCK OF TEXT FROM ANCHOR SPEECH ONLY

FIG. 12
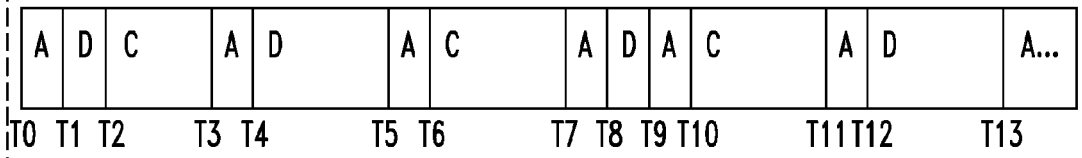
(a)
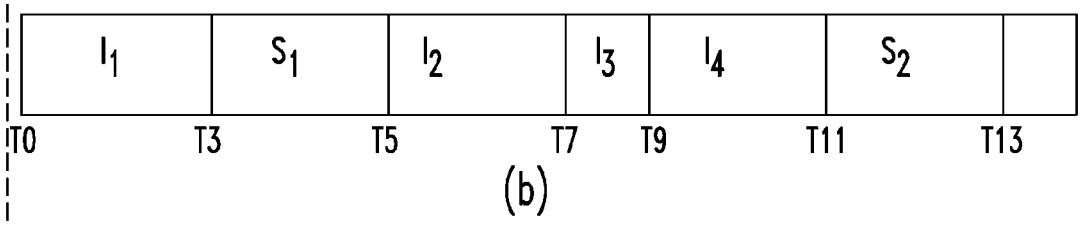
(b)
NEWS STORIES
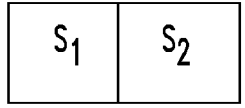
AUGMENTED NEWS STORIES
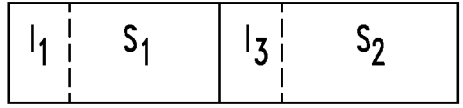
NEWS SUMMARY OF THE DAY
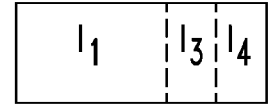
(c)

FIG. 17

AT&T Broadcast News Program Browser

News Program Selection [NBC-Nightly News ▷]  Year [1998 ▷]  Month [Feb. ▷]  Day [12 ▷]

Playback with ☑ Video  ☑ Caption  [Stop Playing] [Streamline] [Show News Presentation]

Table of Content

- ■ Entire News Progr
- ■ News Report
- ■ News Summary
- ■ Story 1 – Iraq
- ■ Story 2 – lens
- ■ Story 3 – pred
- ■ Story 4 – spot
- ☐ Story 5 – youn
- ■ Story 6 – blam
- Commercials
- ■ Commercials 1
- ■ Commercials 2
- ■ Commercials 3
- ■ Commercials 4
- ■ Commercials 5

5th STORY

KEYWORDS
youngsters
tribal
desperate
reservation
contagious
hanging
confined

VISUAL REPRESENTATION
OF STORY
SUICIDE RATE
AMONG YOUNGSTERS

Key Scene 1

VISUAL REPRESENTATION
OF STORY

Key Scene 2

VISUAL REPRESENTATION
OF STORY

Key Scene 3

VISUAL REPRESENTATION
OF STORY

Key Scene 4

VISUAL REPRESENTATION
OF STORY

Key Scene 5

Story Text youngsters have killed
themselves and the tribal
council fears outside attention
will make matters worst
But others are desperate for
help and they believe the tribe
has the means to get
Jim Avila tonight
Reporter death is in the air
on the standing rock reservation
The once proud descendants
of Sitting Bull are killing
themselves
my children told me we come
from death alley
a terrible nickname earned since
August

SYSTEM AND METHOD FOR AUTOMATED MULTIMEDIA CONTENT INDEXING AND RETRIEVAL

CROSS REFERENCE TO RELATED APPLICATIONS

This application is a continuation of U.S. patent application Ser. No. 10/686,459, filed Oct. 15, 2003, now U.S. Pat. No. 7,184,959, which is a continuation of Ser. No. 09/716,278, filed Nov. 21, 2000, U.S. Pat. No. 6,714,909, issued on May 30, 2004, which claims priority from U.S. Pat. No. 6,317,710, issued on Nov. 13, 2001, which claims priority from U.S. Provisional Patent Application No. 60/096,372, and U.S. Pat. No. 6,801,895, issued on Oct. 5, 2004, which claim priority from Provisional Patent Application No. 60/111,273. The above-referenced patent applications are each incorporated herein by reference.

FIELD OF INVENTION

The invention relates to automatically performing content-based indexing of structured multimedia data.

BACKGROUND OF THE INVENTION

The amount of information generated in society is growing exponentially. Moreover, the data is made available in more than one dimension across different media, such as video, audio, and text. This mass of multimedia information poses serious technological challenges in terms of how multimedia data can be integrated, processed, organized, and indexed in a semantically meaningful manner to facilitate effective retrieval.

When the amount of data is small, a user can retrieve desired content in a linear fashion by simply browsing the data sequentially. With the large amounts of data now available, and expected to grow in the future, such linear searching is not longer feasible. One example used daily is a table of contents for a book. The larger the amount of information, the more the abstraction needed to create the table of contents. For instance, while dividing an article into a few sections may suffice, a book may need subsection or even sub-subsections for lower level details and chapters for higher level abstraction. Furthermore, when the number of books published grows rapidly, in order to assist people to choose appropriate books to buy, books are grouped into different categories such as physics, mathematics, and computer hardware or into even higher levels of abstraction such as categories of literature, science, travel, or cooking.

Usually, a content structure is designed by the producer before the data is being generated and recorded. To enable future content based retrieval, such intended semantic structure (metadata) should be conveyed simultaneously to the users as the content (data) is delivered. In this way, users can choose what they desire based on the description in such metadata. For example, every book or magazine is published together with its table of contents, through which users can find the page number (index) where the desired information is printed by simply jumping to the page.

There are different methods to generate the above described abstraction or metadata. The most intuitive one is to do it manually as in the case of books (table of contents) or broadcast news (closed caption) delivered from major American national broadcast news companies. Since manual generation of index is very labor intensive, and thus, expensive, most types of digital data in practice is still delivered without metadata attached.

SUMMARY OF THE INVENTION

The invention provides a system and method for automation of index and retrieval processes for multimedia data. The system and method provide the ability to segment multimedia data, such as news broadcasts, into retrievable units that are directly related to what users perceive as meaningful.

The method may include separating a multimedia data stream into audio, visual and text components, segmenting the audio, visual and text components based on semantic differences, identifying at least one target speaker using the audio and visual components, identifying a topic of the multimedia event using the segmented text and topic category models, generating a summary of the multimedia event based on the audio, visual and text components, the identified topic and the identified target speaker, and generating a multimedia description of the multimedia event based on the identified target speaker, the identified topic, and the generated summary.

In this regard, the method may include automatically identifying a hierarchy of different types of content. Examples of such content include different speakers (e.g., anchor), news reporting (correspondences or interviews), general news stories, topical news stories, news summaries, or commercials. From such extracted semantics, an indexed table can be constructed so that it provides a compact yet meaningful abstraction of the data. Compared with conventional linear information browsing or keywords based search with a flat layer, the indexed table facilitates non-linear browsing capability that is especially desired when the amount of information is huge.

BRIEF DESCRIPTION OF THE DRAWINGS

The preferred embodiments of the invention will be described in detail with reference to the following figures wherein:

FIG. 12 illustrates an exemplary process of story boundary identification;

FIG. 17 illustrates a visual representation of a story about the suicide problem in an Indian village.

DETAILED DESCRIPTION OF PREFERRED EMBODIMENTS

This invention provides users with the ability to retrieve information from multimedia events, such as broadcast news programs, in a semantically meaningful way at different levels of abstraction. A typical national news program consists of news and commercials. News consists of several headline stories, each of which is usually introduced and summarized by the anchor prior to and following the detailed report by correspondents and quotes and interviews from news makers. Commercials are usually found between different news stories. With this observation, the invention provides an integrated solution to recover this content hierarchy by utilizing cues from different media whenever it is appropriate.

For exemplary purposes, the invention is discussed below in the context of news broadcasts. However, the invention as described herein may be applied to other multimedia events, such as news shows, documentaries, movies, television shows, lectures, etc, within in the spirit and scope of the invention.

Figure 1:
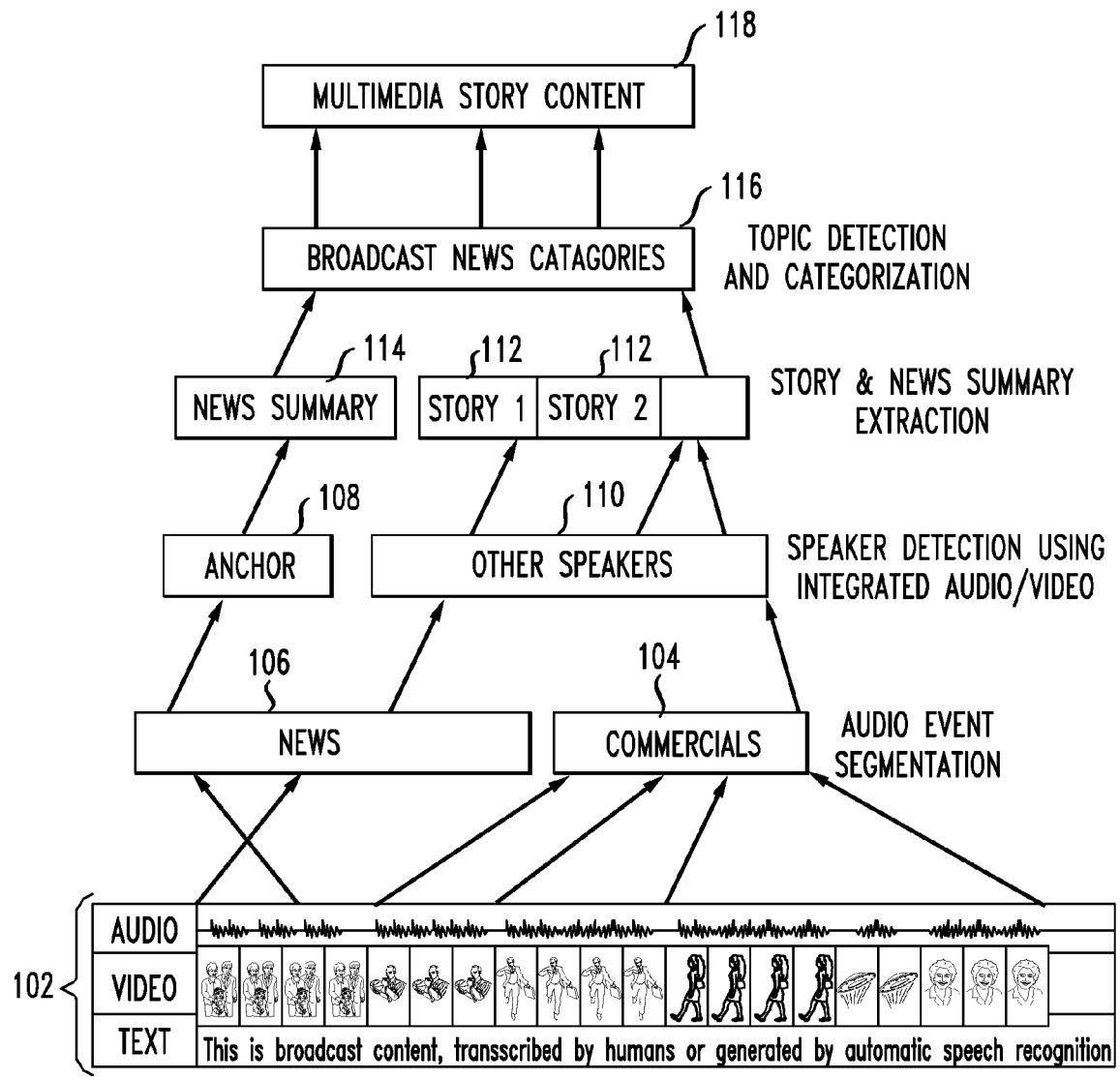
FIG. 1 is diagram illustrating the exemplary content hierarchy of broadcast news programs.

FIG. 1 shows an example of the content hierarchy of broadcast news for recovery. In this hierarchy, the lowest level contains the continuous multimedia data stream (audio, video, text). With the audio, video and text separated as shown 102, linear information retrieval is possible. The audio, video and text are synchronized in time. Text may be from closed caption provided by a media provider or generated by the automatic speech recognition engine. If text originates from closed captioning, time alignment between the audio and text needs to be performed. At the next level, commercials are separated 104. The remaining portion is the newscast 106. The news is then segmented into the anchorperson's speech 108 and the speech from others 110. The intention of this step is to use detected anchor's identity to hypothesize a set of story boundaries that consequently partition the continuous text into adjacent blocks of text. Higher levels of semantic units can then be extracted by grouping the text blocks into individualized news stories 112 and news introductions or summaries 114. In turn, each news story can consist of either the story by itself or augmented by the anchorperson's introduction to the story. Using the extracted stories and summaries/introductions, topics can be detected and categorized 116. The news content is thus finished as multimedia story content available for content-based browsing and nonlinear information retrieval 118. Detailed semantic structure at the story level is shown in FIG. 2.

Figure 2:
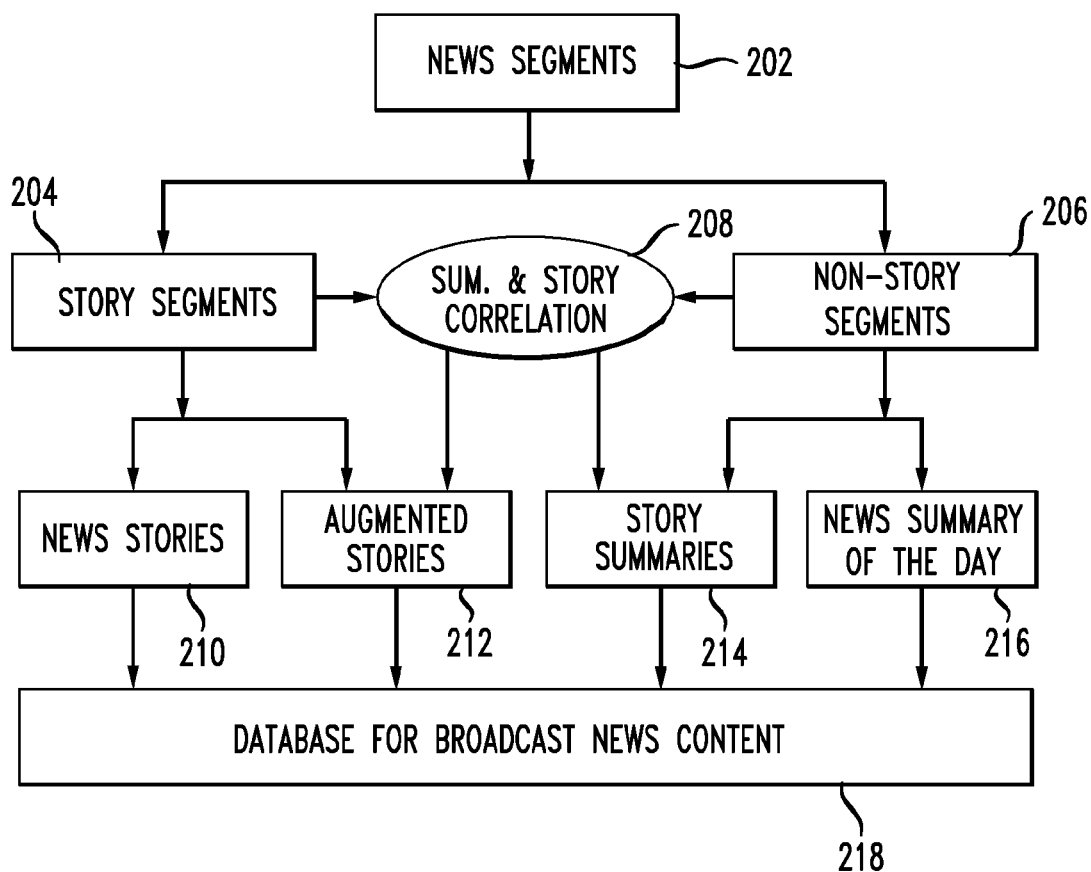
FIG. 2 is a diagram illustrating the relationships among the semantic structures at the story level of the broadcast news programs in FIG. 1.

In FIG. 2, input consists of news segments 202 with boundaries determined by the location of anchorperson segments. Commercial segments are not included. Using duration information, each news segment is initially classified as either the story body 204 (having longer duration) or news introduction/non-story segments 206 (having shorter duration). Further text analysis 208 verifies and refines the story boundaries, the introduction associated with each news story, and the news summary of the day.

The news data is segmented into multiple layers in a hierarchy to meet different needs. For instance, some users may want to retrieve a story directly; some others may want to listen to the news summary of the day in order to decide which story sounds interesting before making further choices; while others (e.g., a user employed in the advertising sector) may have a totally different need, such as monitoring commercials from competitors in order to come up with a competing commercial. This segmentation mechanism partitions the broadcast data in different ways so that direct indices to the events of different interests can be automatically established. Examples include news stories 210, augmented stories 212, news summaries 214 and news summaries of the day 216. The result is a database for broadcast news content 218.

Figure 3:
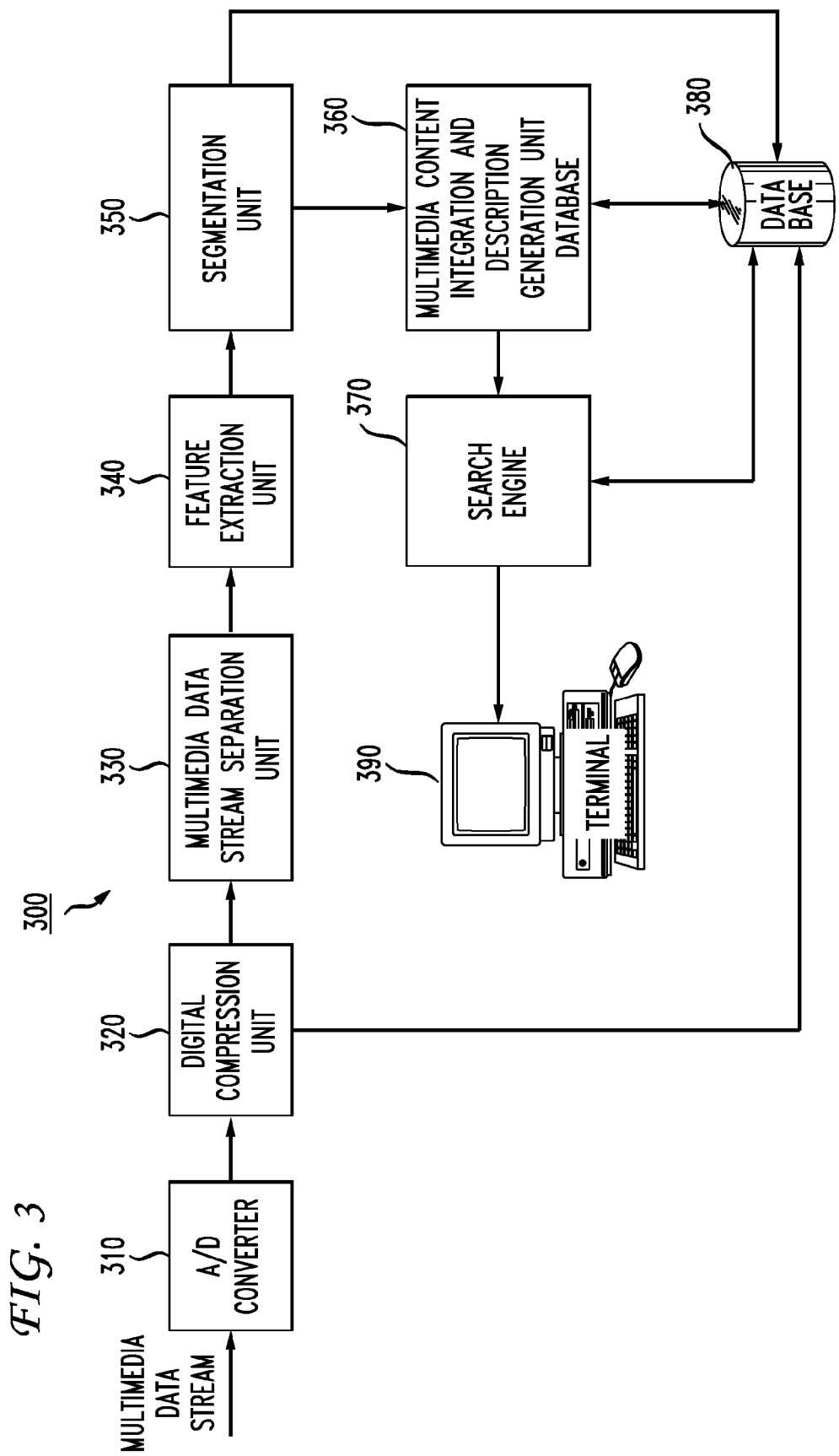
FIG. 3 is a block diagram of an exemplary embodiment of an integrated multimedia content/description generation system.

FIG. 3 is a block diagram of an exemplary automated multimedia content indexing and retrieval system 300. The system 300 includes an analog-to-digital (ND) converter 310, a digital compression unit 320, a media data stream separation unit 330, a feature extraction unit 340, a segmentation unit 350, a multimedia content integration and description generation unit 360, and a database 380. The output of the multimedia content integration and description generation unit 360 is stored in database 380 which can be subsequently retrieved upon a request from a user at terminal 390 through search engine 370.

Figure 4:
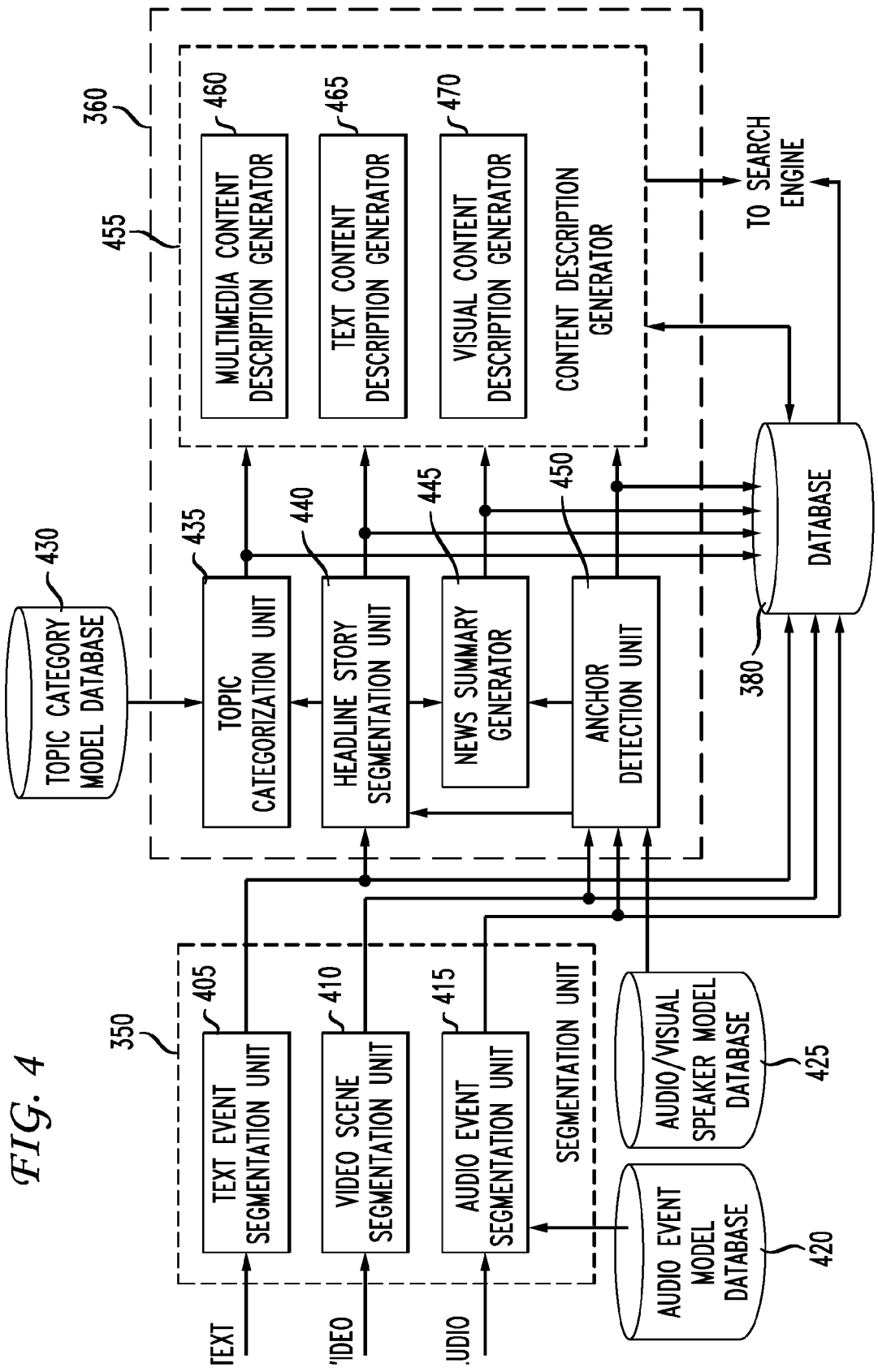
FIG. 4 is a more detailed exemplary block diagram of a portion of the integrated multimedia Content/Description Generation system.

FIG. 4 is a more detailed exemplary block diagram illustrating in more detail various components of the system 300 of FIG. 3. FIG. 4 illustrates the segmentation unit 350 and the multimedia content integration and description generation unit 360. The segmentation unit 350 includes a text event segmentation unit 405, a video scene segmentation unit 410, and an audio event segmentation unit 415. The multimedia content integration and description generation unit 360 includes an anchor detection unit 450, a headline story segmentation unit 440, a topic categorization unit 435, a news summary generator 445, and a content description generator 455. The content description generator 455 includes a multimedia content description generator 460, a text content description generator 465, and a visual content description generator 470.

While the various models used in the automated multimedia content indexing and retrieval process may be stored in the common system database 380, the models as well as the other data used in the system may be stored in separate databases or memories. For ease of discussions, FIG. 4 illustrates the use of separate databases for the models, such as the topic category model database 430, the audio/visual speaker model database 425, and the audio event model database 420.

Figure 5:
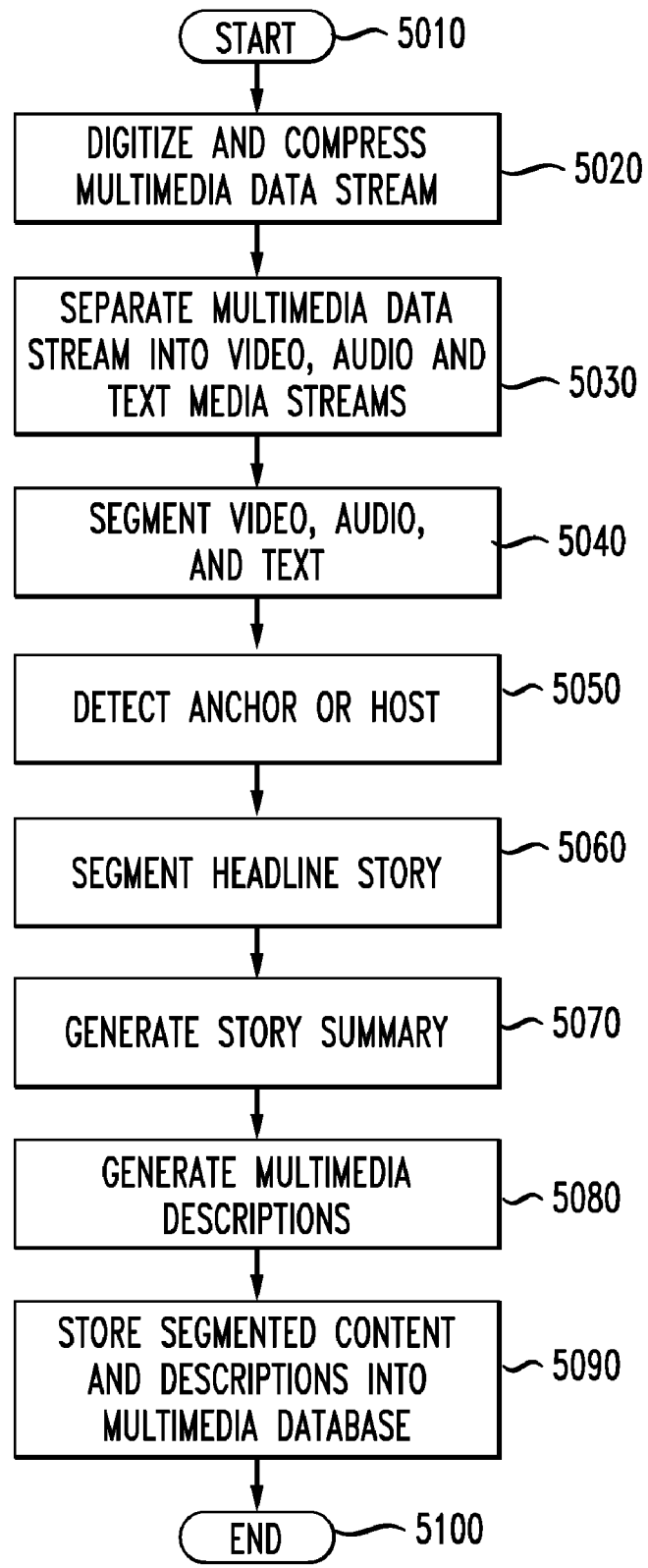
FIG. 5 is a flowchart of an exemplary integrated multimedia Content/Description Generation system process.

In FIG. 5, the automated multimedia content indexing and retrieval process will now be described with reference to the system discussed above, and FIGS. 6-18 below. The process begins at step 5010 and moves to step 5020 where an analog-to-digital converter 310 converts the analog multimedia data stream into a digital bit stream. The digital bit stream is compressed by the digital compression unit 320 using any known compression technique (e.g., MPEG, MP3, etc.). The compressed digital bit stream may also be stored in database 380. Then, in step 5030, the compressed multimedia data bit stream is separated into audio, visual, and textual components by the multimedia data stream separation unit 330.

Figure 6:
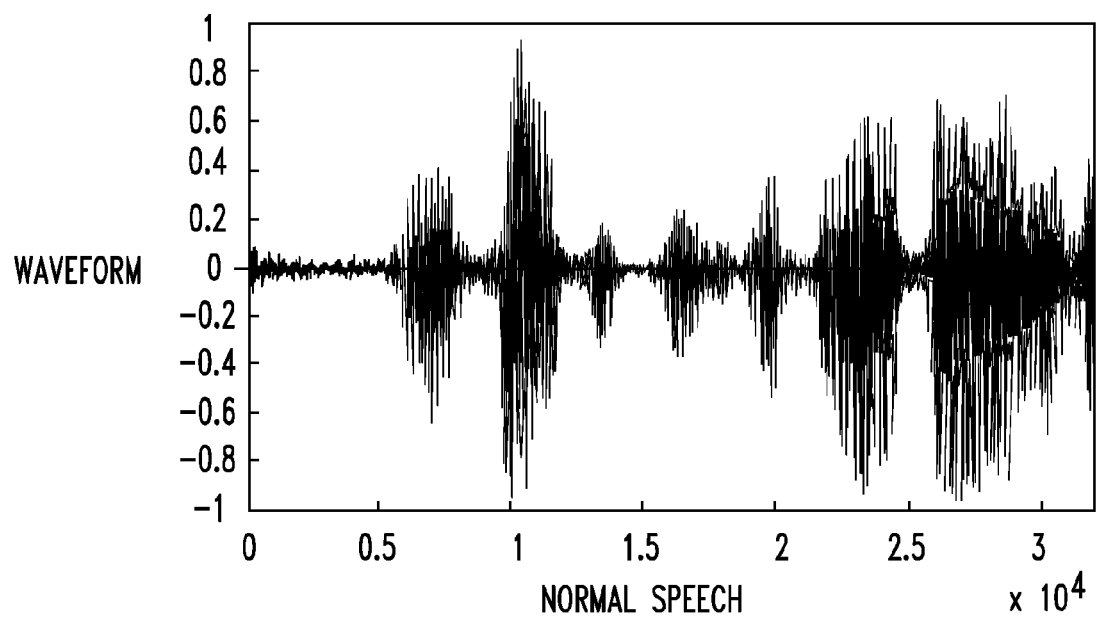
FIGS. 6 and 7 illustrate typical waveforms for news reporting and commercials.
Figure 7:
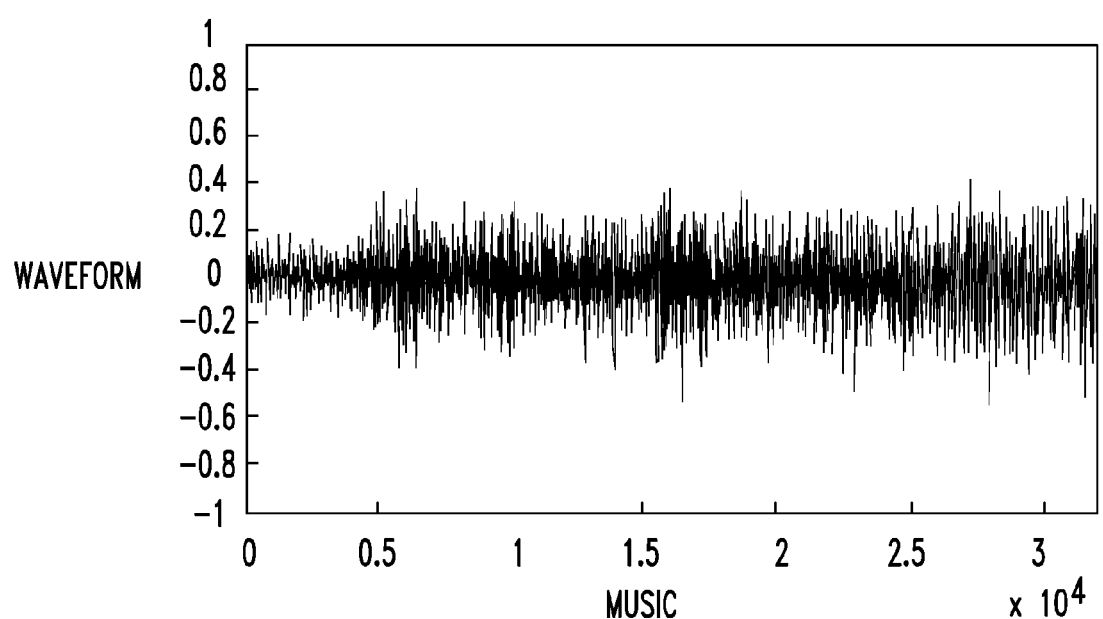

In step 5040, the feature extraction unit 340 and the segmentation unit 350 identify features and parse the broadcast into segments. For example, separate news and commercials are identified and segmented based on acoustic characteristics of audio data. FIGS. 6 and 7 show the typical waveforms for news reporting (FIG. 6) and commercials (FIG. 7). There is obviously a visual difference between the two waveforms. Such a difference is largely caused by the background music in the commercials. Thus, a set of audio features is adopted to capture this observed difference.

For example, the audio data used may be sampled at 16 KHz per second and 16 bits per sample. A feature extraction unit 340 extracts audio features at both frame and clip levels, where clip level features are computed based on the ones from frame level. Each frame consists of 512 samples and adjacent frames overlap by 256 samples. A clip is defined as a group of adjacent frames within the time span of 1 to 3 seconds after proper removal of silence gaps. The duration of each clip is so determined that it is short enough for acceptable delay and long enough for extracting reliable statistics.

Eight frame level features are extracted by the feature extraction unit 340 from audio signals. They are volume, zero crossing rate, pitch period, frequency centroid, frequency bandwidth, energy ratios in the three subbands. They are defined in detail as follows:

Volume

The volume of a frame is approximated as the root mean square (RMS) of the signal magnitude within the frame. Specifically, the volume of frame n is calculated as:

$$v(n) = \sqrt{\frac{1}{N}\sum_{i=0}^{N-1} s_n^2(i)}$$

where $s_n(i)$ is the $i^{th}$ sample in frame n and N is the total number of samples in frame n.

Zero Crossing Rate

Zero Crossing Rate (ZCR) is defined as the frequency at which the audio waveform crosses the zero axis. It is computed by:

$$ZCR(n) = 0.5 \times \sum_{i=1}^{N-1} |\text{sign}(s_n(i)) - \text{sign}(s_n(i-1))|$$

Pitch Period

Pitch is the fundamental period of an audio waveform. It is an important parameter in the analysis and synthesis of speech signals. Among many available pitch estimation algorithms, the one that uses the shortest time, Average Magnitude Difference Function (AMDF), is adopted to determine the pitch of each frame. The AMDF is defined as:

$$r(l) = \frac{\sum_{i=0}^{N-l-1} |s_n(i+l) - s_n(i)|}{N-l}$$

The estimate of the pitch is defined as the first valley point in the AMDF, identified by searching from left to right within a range of the AMDF function. The valley point is a local minimum that satisfies additional constraints in terms of its value relative to the global minimum as well as its curvature. The search range used in this work is between 2.3 ms and 15.9 ms, set up based on the known pitch range of normal human speech.

Frequency Centroid

Let $S_n(\omega)$ represent the short-time Fourier transform of frame n. The frequency centroid, denoted by C(n), is defined as:

$$C(n) = \frac{\int_0^\pi \omega |S_n(\omega)|^2 d\omega}{\int_0^\pi |S_n(\omega)|^2 d\omega}$$

Frequency Bandwidth

Based on frequency centroid defined above, the frequency bandwidth of frame n, denoted as B(n), can be computed accordingly:

$$B^2(n) = \frac{\int_0^\pi (\omega - C(n))^2 |S_n(\omega)|^2 d\omega}{\int_0^\pi |S_n(\omega)|^2 d\omega}$$

Energy Ratios

The energy ratio in a subband is defined as the ratio of the signal energy in that subband to the total energy. The three subbands used in this feature are: (0, 630), (630, 1720), (1720, 4400). Each subband corresponds to six critical bands that represent cochlea filters in the human auditory model.

A clip level feature is a statistic of the corresponding frame level feature within a clip. Generally, a clip level feature can be classified as either time domain or frequency domain. Six clip level features in time domain are extracted.

Non-Silence Ratio

Non-silence ratio (NSR) is defined as the ratio of the number of silent frames to the total length of the entire clip. A silent frame is detected as a frame whose volume and zero crossing rate are both below some preset thresholds.

Volume Standard Deviation

The volume standard deviation (VSTD) is computed within each clip as the standard deviation of the volume measurements of all the frames within that clip.

Standard Deviation of ZCR

This feature (ZSTD) is the standard deviation of the zero crossing rate within a clip.

Volume Dynamic Range

Volume dynamic range (VDR) is defined as the difference between the maximum and minimum volumes within a clip normalized by the maximum volume. That is, $$VDR = \frac{\max(v(n)) - \min(v(n))}{\max(v(n))}$$

Volume Undulation

Volume undulation (VU) of a clip is defined as the summation of all the difference between neighboring peaks (local maximum) and valleys (local minimum) of the volume contour of the clip. ext(k), k=1, . . . , K is the local extremes of the volume contour in time order, where K is the number of the extremes within the clip. Feature VU can be computed as $$VU = \sum_{k=2}^{K} |ext(k) - ext(k-1)|$$

4 Hz Modulation Energy

Feature 4 Hz modulation energy (4ME) is defined as the frequency component around 4 Hz of a volume contour. It may be computed as:

$$4ME = \frac{\int_0^\infty W(\omega)|C(\omega)|^2 \, d\omega}{\int_0^\infty |C(\omega)|^2 \, d\omega}$$

where $W(\omega)$ is a triangular window function centered at 4 Hz.

In frequency domain, a total of eight clip level features are used, They are defined as below.

Standard Deviation of Pitch Period

Standard deviation of pitch period (PSTD) is calculated based on the pitch period measurements of all the frame within a clip:

Smooth Pitch Ratio

Smooth pitch ratio (SPR) is defined as the ratio of the number of frames that have similar pitch period as the previous frames (the difference of their pitch periods is smaller than a preset threshold) to the total number of frames in the entire clip.

Non-Pitch Ratio

Non-pitch ratio (NPR) is defined as the ratio of the number of frames that no pitch is detected in the search range to the total number of frames in the entire clip.

Frequency Centroid

Frequency centroid (FC) is defined as the energy weighted mean of frequency centroid of each frame.

$$FC = \frac{\sum_{i=1}^{F} FC(i)v^2(i)}{\sum_{i=1}^{F} v^2(i)}$$

Frequency Bandwidth

Frequency bandwidth (BW) is defined as the energy weighted mean of frequency bandwidth of each frame.

Energy ratios of subband 1-3 (ERSB1-3) are energy weighted mean of energy ratios in subband 1-3 of each frame. BW and ERSB1-3 are computed similar to FC.

Figure 8:
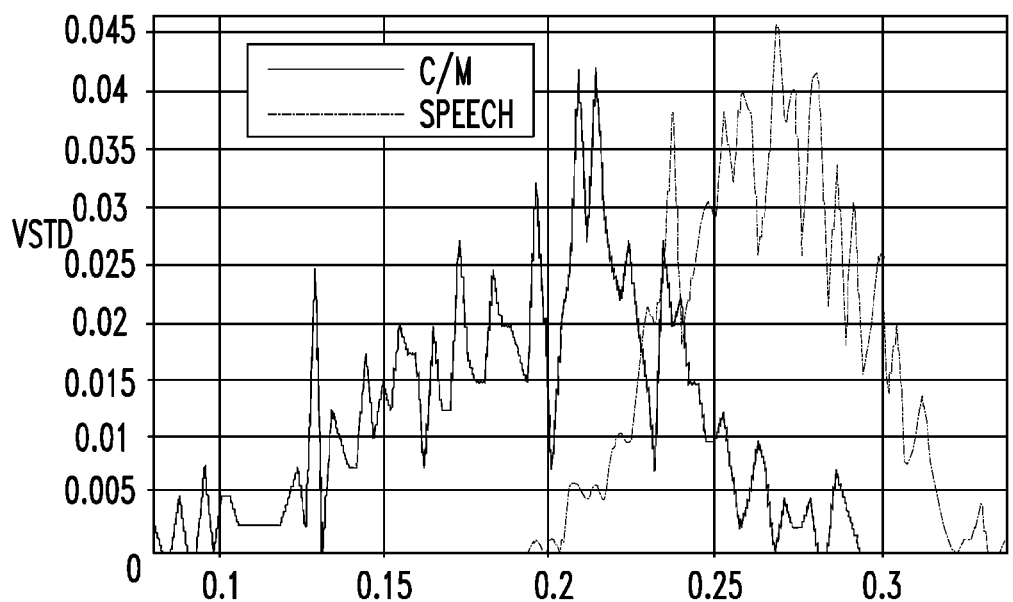
FIG. 8 illustrates an example of the separability of clip level Volume Standard Deviation (VSTD) audio features of an integrated multimedia Content/Description Generation system.
Figure 9:
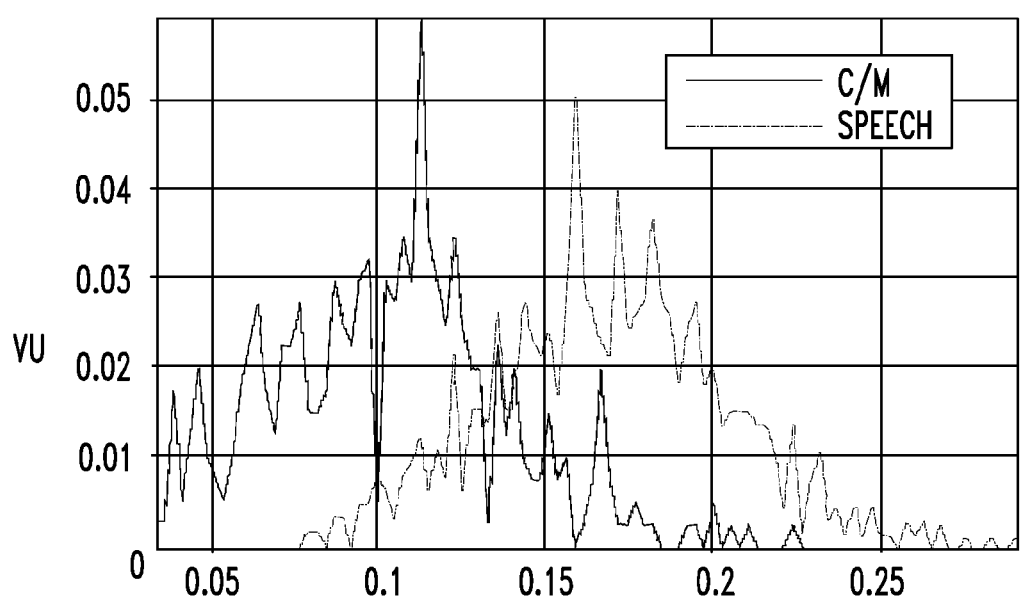
FIG. 9 illustrates an example of the separability of clip level Volume Undulation (VU) audio features of an integrated multimedia Content/Description Generation system.

These features are chosen and extracted by the feature extraction unit 340 so that the underlying audio events (news vs. commercials) can be reasonably segmented by the segmentation unit 350 in the feature space. For example, FIGS. 8 and 9 show the separability of features VSTD and VU. These features are designed so that different audio events characterized using these features are reasonably separated into the feature space.

Figures 10, 11:
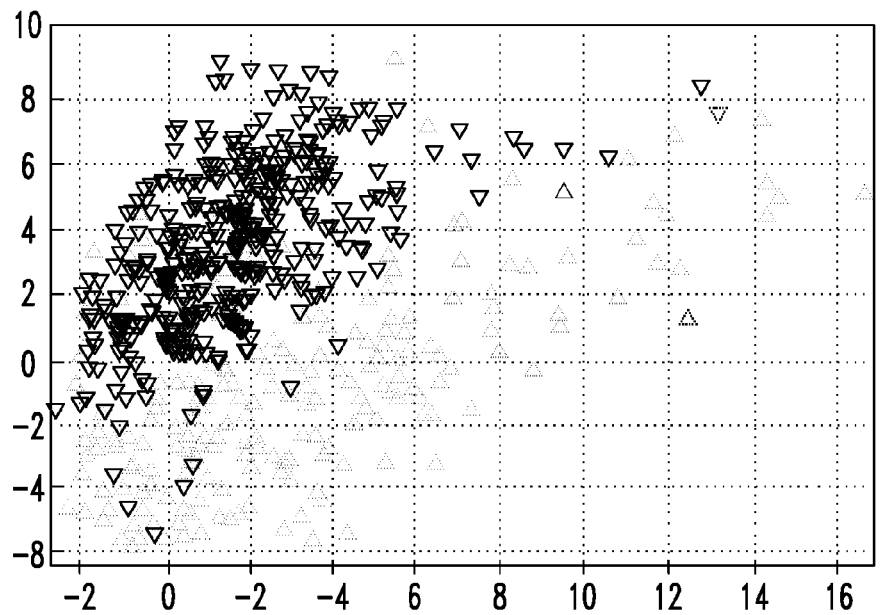
FIG. 10 illustrates visualized separability of audio feature vectors containing 14 chip level features projected into two-dimensional (2D) space using the Karhunen-Loeve transformation.
FIG. 11 illustrates the detection of anchor segments which leads to the initial text partition for story segmentation.

FIG. 10 shows the 2D projection of all the training feature vectors using Karhunen-Loeve transformation. Each feature vector contains 14 chip level features. From FIGS. 8, 9 and 10, it can be seen that the separability of the chosen features is quite reasonable.

Four different classification methods were tested in segmenting or separating news from commercials: hard threshold classifier, linear fuzzy classifier, GMM (Gaussian Mixture Model) based classifier, and SVM (Support Vector Machine). Each classification scheme is briefly described below.

Nine out of 14 audio clip features are used for threshold based classifiers: NSR, VSTD, ZSTD, VDR, VU, 4ME, SPR, NPR, and ERSB2. The thresholds are automatically chosen by fitting a bimodal Gaussian to the feature distributions computed from training data. The features that fail the fitting are dropped. A test sample is classified as either news reporting or commercials, depending on which side of the threshold it resides in the feature space.

Although hard threshold classification method is simple, it is not desirable. Failure in a single feature condition will affect the classification decision in a drastic manner. As an improvement, a fuzzy mechanism is designed in which each feature is associated with a fuzzy membership function and the impact that each feature attributes to the overall decision is realized in the form of a weighted sum, where each weight is derived from the fuzzy membership function of that feature. An overall threshold value is then applied to the weighted sum to reach the final decision of the classification.

The threshold based method is in general, inflexible. Another approach is to build models for the underlying classes using labeled training data. Based on such trained models, a test sample can be classified using a maximum likelihood method.

Gaussian Mixture Model (GMM) is employed to model news and commercial classes, individually. A GMM model consists of a set of weighted Gaussian:

$$f(x) = \sum_{i=1}^{K} \omega_i \times g(M_i, \Sigma_i, x),$$

$$g(M_i, \Sigma_i, x) = \frac{\exp\left\{-\frac{(x-M_i)^T \Sigma_i^{-1} (x-M_i)}{2}\right\}}{\left(\sqrt{2\pi}\right)^n \sqrt{\det(\Sigma_i)}}$$

where K is the number of mixtures, $M_i$ and $\Sigma_i$ are the mean vector and covariance matrix of the $i^{th}$ mixture, respectively, and $\omega_i$ is the weight associated with the $i^{th}$ Gaussian. Based on training data, the parameter set $\lambda=(\omega,M,E)$ is optimized such that f(x) best fits the given data. The initial parameters are estimated from a clustering algorithm, then an expectation maximization (EM) method is used to iteratively refine the parameters until some preset conditions are met.

It is known, theoretically, that ML based estimation method for Gaussian mixture model has no optimal solution. In practice, an acceptable model can be derived by limiting the covariance of each feature within a specified range. The decision about the number of mixtures used in the model is empirical, relating to both the data characteristic and the amount of training data available. Models are benchmarked with different parameter settings to obtain the best parameter combination with respect to classification performance.

Support vector machines map an input space into a high-dimensional feature space denoted by Z (a Hilbert Space) through some non-linear mapping Φ chosen a priori and then identify the optimal separating hyperplane in the feature space Z, making it possible to construct linear decision surfaces in the feature space Z that correspond to the nonlinear decision surfaces in the input space.

To construct the optimal separating hyperplane in feature space Z, there is no need to consider the feature space in explicit form. Without knowing the mapping function Φ, the inner product of twin vectors $z_1$, and $z_2$ can be expressed in feature space Z as $(z_1, z_2) = K(x_1, x_2)$, where $z_1$ and $z_2$ are the images in the feature space of vector $x_1$ and $x_2$ in the input space. The kernel function K(x,y) can be any symmetric function that satisfies the Mercer condition. In this manner, dot product and polynomial function are experimented as kernel functions. They are defined as:

$$K(x,y) = x \cdot y,$$

$$K(x,y) = ((x \cdot y) + 1)^d, d=1,$$

where d is the order of polynomial kernel.

A pattern recognition problem in SVM can be formulated as follows: for a set of samples $(z_i, y_i)$, $z_i \in Z$, $y_i \in \{1, -1\}$, i=1, ..., N, the optimal hyperplane f(z)=(w,z)+b, that satisfies sign(f($z_i$))=$y_I$ needs to be found. The embedded idea introduced by SVM is to minimize an upper bound on the generalization error. Considering the freedom to scale w and b simultaneously, there is another requirement for a canonical pair:

$$\min_{i=1,...N} |(w \cdot z_i) + b| = 1$$

Experimental results on news/commercial segmentation using different classifiers are discussed below.

In step 5050, detection of anchorperson segments is carried out by the anchor detection unit 450 using text independent speaker verification techniques. The segmentation at this level distinguishes the anchorperson segments against a background of speech segments spoken by other persons as well as other audio segments (chiefly commercials). The target speaker, background speakers, and other background audio categories are represented by 64 mixture components Gaussian Mixture Models (GMM's) with diagonal covariance matrices. The broadcast speech and audio signal is analyzed to extract 13 cepstral coefficients and the pitch every 10 msec augmented by 13 delta cepstral as well as delta pitch features. The GMM's are constructed using labeled training data in the form of sets of the 28-component feature vectors. A target speaker detection method based on likelihood ratio values for test broadcast data is evaluated from the models using appropriate normalization and smoothing mechanisms.

Different training strategies were tested and compared. Benchmarking experiments against different thresholds were also conducted in order to choose the most effective system setting. Performance is measured at two different levels: the segment hit rate and the segmentation precision. Some of the experimental results are presented below using these performance measures.

In step 5060, the anchor level segmentation performed by the anchor detection unit 450 is fed into the headline story segmentation unit 440 to generate a set of hypothesized story boundaries. Typically each half-hour news program yields 13-15 segments of anchor speech of which 5-6 correspond to the beginning of a new story. Since not every anchor speech segment starts a new story, further analysis is needed to detect true story boundaries. The results from anchor identification correspondingly partitions the synchronized text data provided by the text event segmentation unit 405 into blocks of text.

FIG. 12 illustrates a stream of detected audio events where A stands for anchor's speech, D stands for detailed reporting (from non-anchor people), and C stands for commercials. The center timeline in FIG. 12 shows the segments of text obtained from the text event segmentation unit 405 using marker A where the duration of each segment does not include commercials. Due to the structure of the broadcast data, a new story can not start in the middle of a block of text segmented using detected anchor location and only some of these text blocks correspond to individual news stories. Therefore, further verification is needed.

Up to this point, there are a set of hypothesized story boundaries as shown in FIG. 11. The segments with label "A" indicates that they are anchor segments, "D" detailed news reporting, and "C" commercials. With identified "A" segments, the synchronized text can be partitioned into two sets of text blocks:

$$T_1 = \{T_1^1, T_1^2, \ldots, T_1^n\},$$

$$T_2 = \{T_2^1, T_2^2, \ldots, T_2^n\},$$

where $T_1^i$ is a block of text that starts with anchor speech and $T_2^i$ is a subblock of $T_1^i$ containing only the text from the anchor speech. Based on the structure of the broadcast news, each news story consists of one or more $T_1^i$'s.

The goal is to extract three classes of semantics: news stories, augmented stories (augmented by the introduction of the story by the anchor), and news summary of the day. At this stage, text cues are further integrated with the cues from audio and video in performing the analysis to (1) separate news stories and news introductions, (2) verify story boundaries, (3) for each detected story, identifies the news introduction segment associated with that story, and (4) form news summary of the day by finding a minimum set of news introduction segments that cover all the detected stories.

With blocks of text available at this point, the task is to determine how these blocks of text can be merged to form semantically coherent content based on appropriate criteria. Since news introductions are to provide a brief and succinct message about the story, they naturally have a much shorter duration than the detailed news reports. Based on this observation, in step 5060, a headline story segmentation unit 440 initially classifies each block of text as a story candidate or an introduction candidate based on duration. Such initial labels are shown in FIG. 12 where "I" represents the introduction and "S" represents the story. The remaining tasks are to verify the initial segmentation of news introductions and stories and to form three classes of semantics indicated in the bottom of FIG. 12: individual news stories, augmented news stories, and a news summary.

A news story represents merely the story body itself. An augmented story consists of the introduction that previews the story and the story body. The news summary generator generates the news summary of the day from introductions for each and every news story reported on that day. For example, in FIG. 12, the second augmented story is formed by the third introduction section and the second story body. The news summary of the day does not necessarily include all the introduction sections. What is being sought is a minimum set of anchor speech that previews all the headline stories. For example, in FIG. 12, the second introduction section is not included in news summary of the day.

Formally, the input data for text analysis is two sets of blocks of text: $T_1 = \{T_1^1, \ldots, T_1^i, \ldots, T_1^m\}$ where each $T_1^k$, $1 \leq k \leq m$, begins with the anchor person's speech (corresponding to the blocks shown in FIG. 12) and $T_2 = \{T_2^1, \ldots, T_2^i, \ldots, T_2^n\}$ where each $T_2^k$, $1 \leq k \leq n$, contains only the anchor's speech. The blocks in both sets are all time stamped, m=n and $T_2^k \subset T_1^k$. To verify story boundaries, similarity measure sim( ) is evaluated between every pair $(T_{b1}, T_{b2})$ of adjacent blocks:

$$sim(T_{b1}, T_{b2}) = \frac{\sum_w f_{w,b_1} \times f_{w,b_2}}{\sqrt{\sum_w f^2{}_{w,b_1} \times \sum_w f^2{}_{w,b_2}}}$$

Here, w enumerates all the token words in each text block; $f_{w,b1}$ is the weighted frequency of word w in block $b_i$, $i \in \{1,2\}$ and $0 \leq sim(\ ) \leq 1$. In this process, the token words are extracted by excluding all the stop words from the text. The frequency of each token word is then weighted by the standard frequency of the same word computed from a corpus of broadcast news data collected from NBC Nightly News in 1997. The higher the frequencies of the common words in the two involved blocks are, the more similar the content of the blocks. A threshold is experimentally set up to determine the story boundaries.

The output of the headline story segmentation unit 440 contains the story boundary verification as a set of text blocks $$S = \{S_1, S_2, \ldots, S_m\},$$

where $S_i = T^j{}_1 - T^j{}_2$, $1 \leq i, j \leq n$. With news stories segmented, set $T_2$ and the story set S are processed to further extract other classes. For each story, its introduction is identified by finding a $T_2^k$ that has the highest similarity to that story ($T_2^k$ is not necessarily connected to the story). Merging each story with its introduction segment, an augmented story is formed. That is, using S and $T_2$, augmented news stories set $$S^a = \{S_1^a, S_2^a, \ldots, S_m^a\},$$

can be generated by identifying each
$S_i^a = S_i \cup T_2^j$, $1 \leq i \leq m$, $1 \leq j \leq n$
such that $sim(S_i, T_2^j)$ is maximized. Notice here, different $S_i$ may associate with the same $T_2^j$.

In step 5070, the news summary of the day is extracted by the news summary generator 445 with the criterion that it has to provide the minimum coverage for all the stories reported on that day. Therefore, it is a minimum set of $T_2^k$'s that together introduces all the stories of the day without overlap (i.e., each story has to be introduced but only once). Based on this requirement, a set of text blocks from $T_2$ is chosen to form news summary of the day by using the following criterion:

$$NS = \bigcup_{1 \leq k_i \leq n} T_2^{k_i},$$

such that $\Sigma_{i=1}^m sim(S_i, T_2^{k_i})$ is maximized. With such a higher level of abstraction, users can browse desired information in a very compact form without losing primary content.

In contrast to conventional discourse segmentation methods, the story segmentation and the intention is performed based on integrated audio/visual/text cues. Since anchor-based segmentation performed by the anchor detection unit 450 provides the initial segmentation of text, in effect, (1) adaptive granularity that is directly related to the content is achieved, (2) the hypothesized boundaries are more natural than those obtained using a fixed window, commonly adopted in a conventional discourse segmentation method, (3) blocks formed in this way not only contain enough information for similarity comparison but also have natural breaks of chains of repeated words if true boundaries are present, (4) the original task of discourse segmentation is achieved by boundary verification, and (5) once a boundary is verified, its location is far more precise than what conventional discourse segmentation algorithms can achieve. This integrated multimodal analysis provides an excellent starting point for the similarity analysis and boundary detection.

Differing from most studies in the literature where the processing is applied only to adjacent blocks of text, some of the semantics attempted to be extracted require merging of disconnected blocks of text. One example is the news summary of the day (because the anchor's introductions to different headline stories are scattered throughout the half-hour program).

In the discussion above, a mechanism to recover the semantic structure of the data has been addressed so that it can be used by the content description generator 455 in step 5080 for creating appropriate descriptions of the extracted multimedia content. For effective retrieval, generating a proper presentation for the multimedia content is another equally important task related to human machine interface: how to present the extracted semantic units in a form that is compact, concise, easy to understand, and at the same time visually pleasing. Now, three aspects of this task are examined. First, how to present the semantic structure to the users; second, how to represent the particular semantics based on the content of the news story; and third, how to form the representation for news summary of the day.

A commonly used presentation for semantic structure is in the form of a table of contents. Since this concept is familiar to most users, it is employed in this representation as well. In addition, in order to give users a sense of time, a streamline representation for the semantic structure is also designed.

Figure 13:
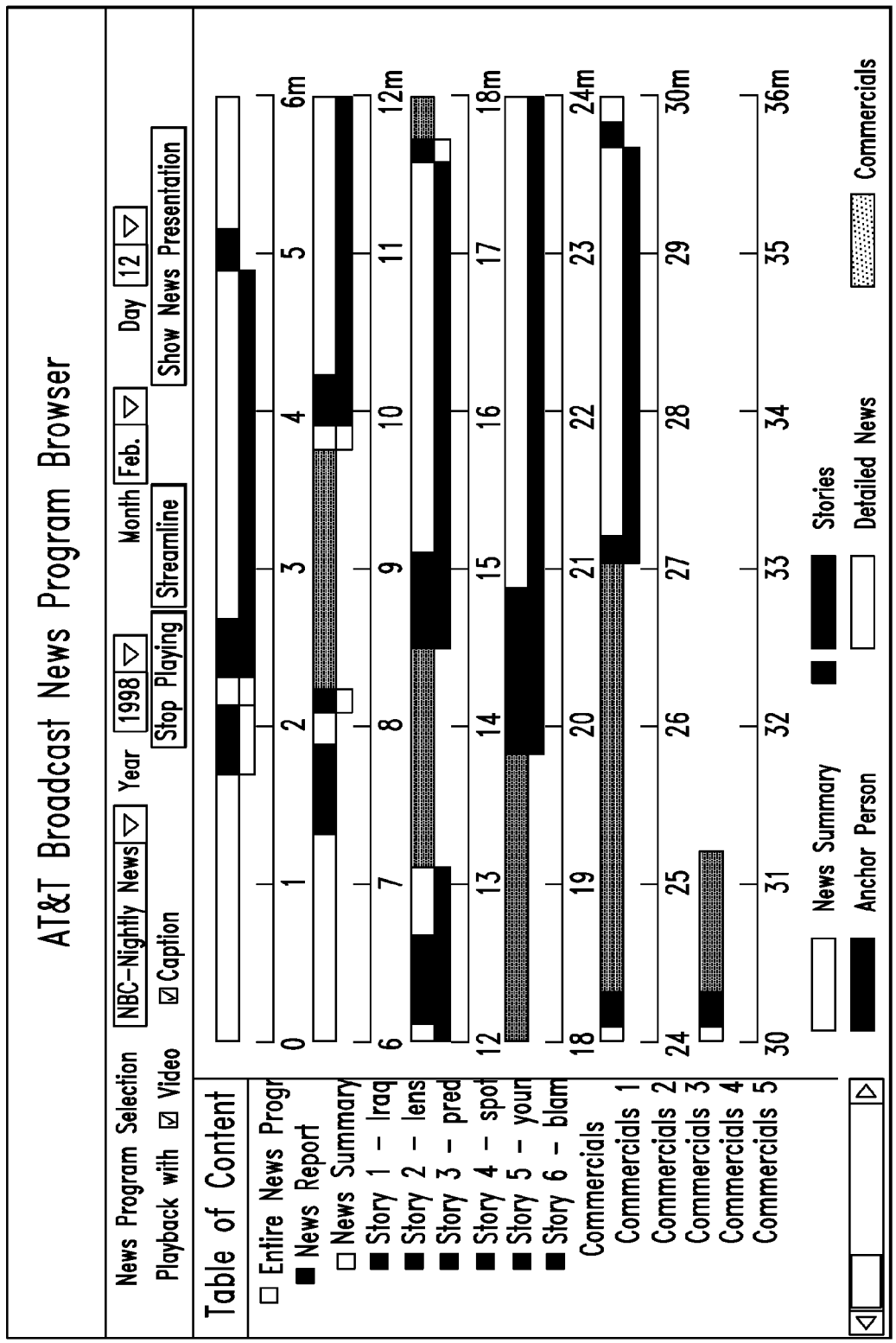
FIG. 13 illustrates the representation for extracted semantic structures.

FIG. 13 shows an exemplary presentation for the semantic structure of a news program. On the left of the screen, different semantics are categorized in the form of a table of contents (commercials, news, and individual news stories, etc.). It is in a familiar hierarchical fashion which indexes directly into the time stamped media data. Each item listed is color coded by an icon of a button. To playback a particular item, a user simply clicks on the button of the desired item in this hierarchical table. On the right of this interface is the streamline representation where the time line runs from left to right and top to bottom. Along the time line FIG. 13, there are two layers of categorization at any time instance. The top layer is event based (anchor speech, others' speech, and commercials) and the bottom layer is semantics based (stories, news introduction, and news summary of the day). Each distinct section is marked by a different color and the overall color codes correspond to the color codes used in the table of contents. Obviously, the content categorized in this representation is aligned with time simultaneously.

These two representations are directly related to each other, although one (table) is more conceptual and the other more visual. When users click on a particular segment in the streamline representation, it triggers the same effect as clicking on a particular item in the table of content. When an item in the table is chosen to be played back, the corresponding segment in the streamline becomes active (flash), which also gives users a sense of time. For example, if a user chooses to play the second story by clicking on the second item under story category in the table of contents, the corresponding segment in the streamline representation will blink during the play back. Therefore, while the table of contents provides a conceptual abstraction of the content (without the structure along time), the streamline representation gives a description of how content is distributed in a news program. With these two complementary representations, users can quickly get a sense of both the semantic structure of the data and the timing. Through this representation, users can easily perform non-linear retrieval.

The segmented content and multimedia descriptions (including the table of contents), are stored in multimedia database 380 in step 5090. The stored multimedia data may be retrieved and provided to a user's terminal 390 through search engine 370 upon a user's request. The process goes to step 5100 and ends.

Figure 14:
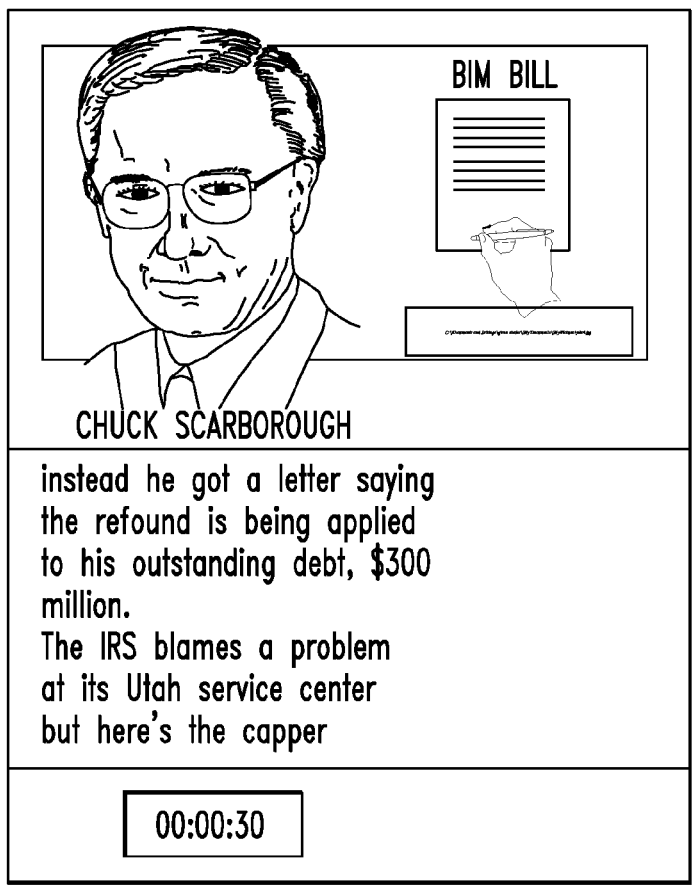
FIG. 14 illustrates the representation of a playback interface.

FIG. 14 is a window that plays back streaming content to a user. It is triggered when users click on a particular item. In this playback window, the upper portion shows the video and the lower portion the text synchronized with the video. During playback, audio is synchronized with video. Either key frames or the original video stream is played back. The text scrolls up with time. In the black box at the bottom, the timing with respect to the starting point of the program is given.

For each extracted news story, two forms of representation may be developed. One is textual and another is combination of text with visual. The goal is to automatically construct the representation in a form that is most relevant to the content of the underlying story. For textual representation, keywords are chosen in step 5080 above, from the story according to their importance computed as weighted frequency.

Figure 16:
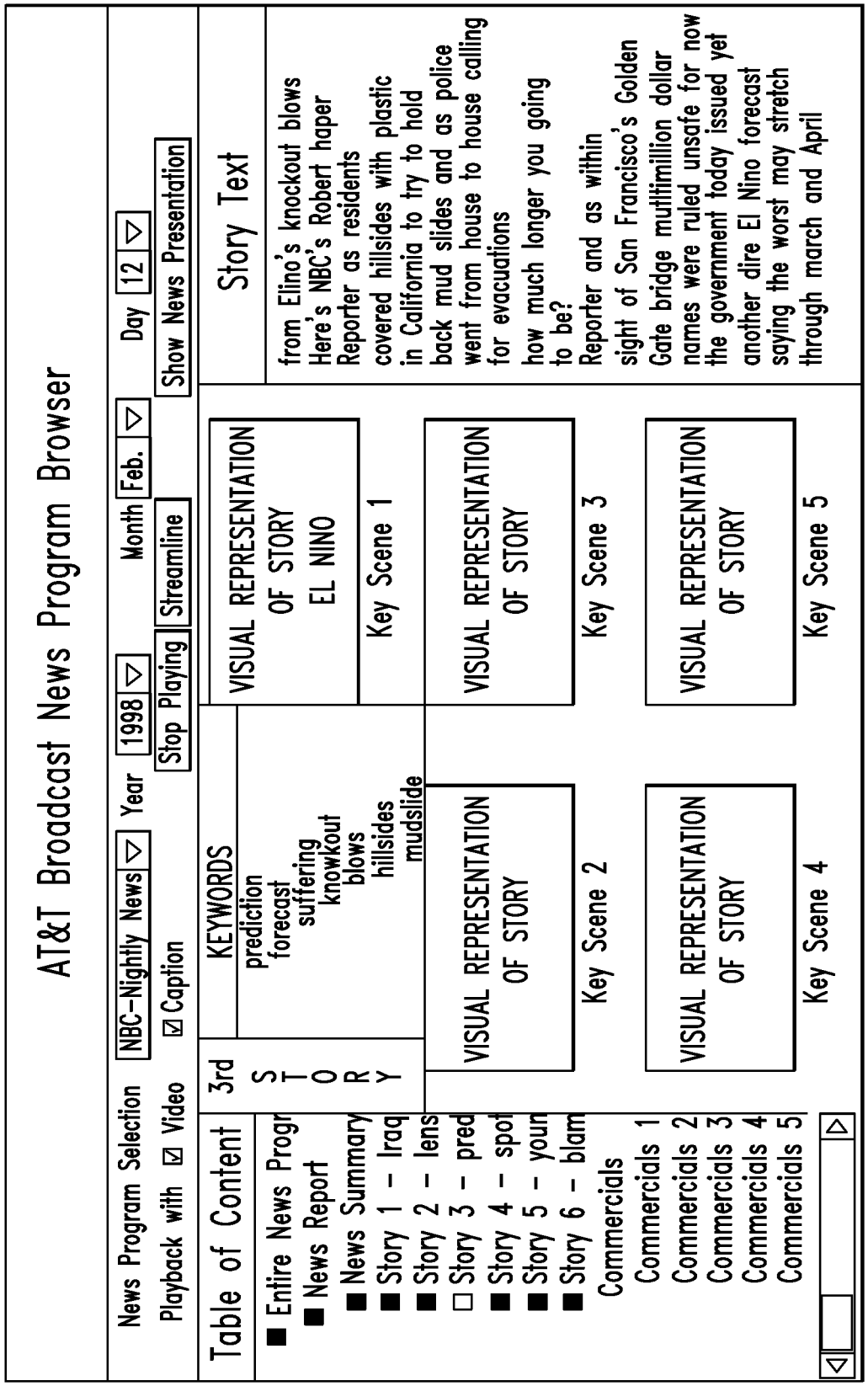
FIG. 16 illustrates a visual representation of a story about El Nino.

In the table of contents generated by the content description generator 455 shown in FIG. 13, next to each story listed, a set of 10 keywords are given. The intention is that users will get a feeling about the content of the story. Another more detailed representation for a story is called "story icon". To invoke it for a particular story, users can click on the "StoryIcon" in the interface illustrated in FIG. 13. FIGS. 16 and 17 give two examples of such story representation. A content based method to automatically construct this visual story representation has been designed.

Figure 15:
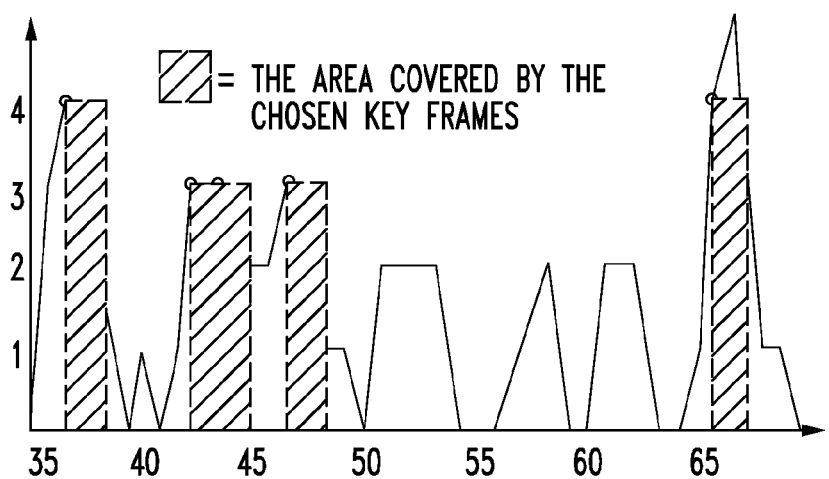
FIG. 15 illustrates a histogram of keywords within a story.

Within the boundary of each story, a keyword histogram is first constructed as shown in FIG. 15 where the X-axis is the keyframe numbers and the Y-axis is the frequency of the keywords. In the figure, the solid curve is the keyword histogram. A fixed number of key frames within the boundary are chosen so that they (1) are not within anchor speech segments and (2) yield maximum covered area with respect to the keywords histogram. The peak points marked on the histogram in FIG. 15 indicate the positions of the chosen frames and the shaded area underneath them defines the total area coverage on the histogram by the chosen key frames.

The exemplary representation of two stories are shown in FIGS. 16 and 17. The chosen stories are the third and fifth news program, respectively (which can be seen in the table of contents on the left portion of the interface). The representation for each story has three parts: the upper left corner is a set of 10 keywords automatically chosen from the segmented story text based on the relative importance of the words; the right part displays the full text of the story; the rest is the visual presentation of the story consisting of five images chosen from video in the content based manner described above.

FIG. 16 is the visual representation about a story on El Nino and FIG. 17 is the visual representation of a story about the high suicide rate among Indian youngsters in a village. As can be seen from both these figures that the story representations constructed this way are compact, semantically revealing, and visually informative with respect to the content of the corresponding stories. A user can choose either to scroll the text on the right to read the story or to click on the button of that story in the table of contents to playback synchronized audio, video, and text, all starting from where the story begins. A different alternative may be to click on one of the representative images to playback multimedia content starting from the point of time where the chosen image is located in the video. Compared with linear browsing or low level scene cut browsing, this system allows a more effective content based non-linear information retrieval.

Finally, the representation for the news summary of the day is constructed by the news summary generator 455. It is composed of k images, where k is the number of headline stories on a particular day. The k images are chosen so that they are the most important in each story, measured by the covered area size in the keyword histogram.

Figure 18:
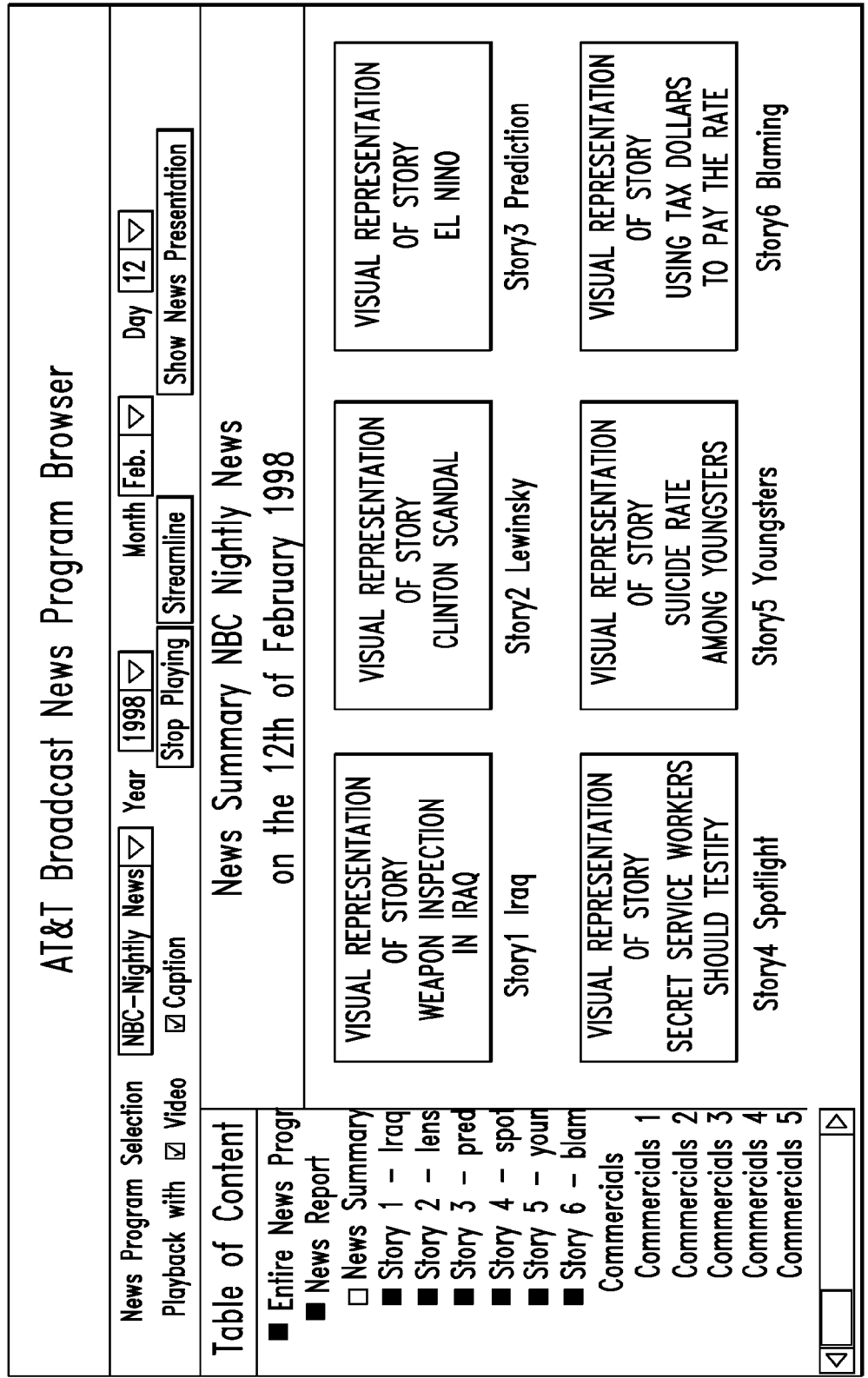
FIG. 18 illustrates an exemplary representation of a news summary for the day.

FIG. 18 gives an exemplary visual representation for the news summary of the day for the NBC Nightly News on 12 Feb. 1998. From this representation, a user can see immediately that there are a total of six headline stories on that particular day. Below the representative image for each story, the list of its keywords is displayed as a right-to-left flow dynamically so that users can get a sense of the story from the keywords (it is not apparent here because a dynamic video sequence cannot be shown). In this example, the first story is about the weapon inspection in Iraq where Russians are suspected to tip Saddam. The second story is about Clinton scandal. The third one is about El Nino. The fourth one is about whether secret service workers should testify against the president. The fifth is about the high suicide rate among youngsters in an Indian village. The sixth is about government's using tax dollars to pay the rent for empty buildings. From these examples, the effectiveness of this story-telling visual representation for the news summary is evident.

While the invention has been described with reference to the embodiments, it is to be understood that the invention is not restricted to the particular forms shown in the foregoing embodiments. Various modifications and alternations can be made thereto without departing from the scope of the invention.

What is claimed is:

1. A method for processing a multimedia event, comprising:
    separating text components from a multimedia data stream associated with the multimedia event to yield separated text components;
    generating a plurality of semantically coherent text blocks from the separated text components using an automated multimedia content indexing and retrieval system, wherein at least one semantically coherent text block is generated by merging disconnected text blocks;
    identifying a target speaker based on audio features in the multimedia data stream to yield an identified target speaker;
    deriving a topic for each text block of the plurality of semantically coherent text blocks based on a set of topic category models to yield derived topics; and
    generating a multimedia description of the multimedia event based at least on the identified target speaker, the plurality of semantically coherent text blocks, and the derived topics, wherein the multimedia description comprises at least a timeline representation having a plurality of layers showing multiple categorizations of the multimedia data stream for each instance of time.

2. The method of claim 1, further comprising:
    separating from the multimedia data stream audio components and visual components in addition to the text components.

3. The method of claim 2, further comprising:
    segmenting the audio components, the visual components, and the text components of the multimedia data stream based on semantic differences, wherein frame level features are extracted from the audio component in a plurality of subbands.

4. The method of claim 3, further comprising:
identifying at least one target speaker using the audio components and the visual components.

5. The method of claim 4, further comprising:
generating a summary of multimedia content based on the audio components, the visual components, the text components, the semantically coherent text blocks, and the identified target speaker.

6. The method of claim 5, wherein generating the multimedia description of the multimedia event is further based on the identified target speaker and the summary.

7. The method of claim 1, wherein generating the plurality of semantically coherent text blocks from the separated text components is based at least in part on identified semantic boundaries of text for at least one identified target speaker.

8. A computing device that automatically indexes and retrieves a multimedia event, the computing comprising:
an automated multimedia content indexing and retrieval system;
a first module, using the automated multimedia content indexing and retrieval system, configured to separate text components from a multimedia data stream associated with a multimedia event;
a second module configured to generate a plurality of semantically coherent text blocks from the separated text components;
a third module configured to identify a target speaker based on audio features in the multimedia data stream;
a fourth module configured to derive a topic for each text block of the plurality of semantically coherent text blocks based on a set of topic category models, wherein at least one semantically coherent text block is generated by merging disconnected text blocks; and
a fifth module configured to generate a multimedia description of the multimedia event based at least on the semantically coherent text blocks and the derived topics, wherein the multimedia description comprises at least a timeline representation having a plurality of layers showing multiple categorizations of the multimedia data stream for each instance of time.

9. The computing device of claim 8, further comprising:
a sixth module configured to separate from the multimedia data stream audio components and visual components in addition to the text components.

10. The computing device of claim 9, further comprising:
a seventh module configured to segment the audio components, the visual components, and the text components of the multimedia data stream based on semantic differences, wherein frame level features are extracted from the audio component in a plurality of subbands.

11. The computing device of claim 10, further comprising:
an eighth module configured to identify at least one target speaker using the audio components and the visual components.

12. The computing device of claim 11, further comprising:
a ninth module configured to generate a summary of multimedia content based on the audio components, the visual components, the text components, the semantically coherent text blocks and the identified target speaker.

13. The computing device of claim 8, wherein the second module configured to generate the plurality of semantically coherent text blocks from the separated text components is based at least in part on identified semantic boundaries of text for at least one identified target speaker.

* * * * *